United States Patent [19]

Boyles

[11] Patent Number: 5,323,140
[45] Date of Patent: Jun. 21, 1994

[54] ANTITHEFT SYSTEM FOR USE WITH A VEHICLE

[75] Inventor: William E. Boyles, Houston, Tex.

[73] Assignee: The Friedkin Corporation, Houston, Tex.

[21] Appl. No.: 935,579

[22] Filed: Aug. 26, 1992

[51] Int. Cl.[5] .................................................. B60R 25/10
[52] U.S. Cl. .................................... 340/428; 340/425.5; 340/426; 307/10.1; 307/10.2; 180/287
[58] Field of Search ................... 180/287; 340/428; 307/10.2, 10.3, 10.4, 10.5; 361/342, 331

[56] References Cited

U.S. PATENT DOCUMENTS

| | | | |
|---|---|---|---|
| 3,550,717 | 9/1968 | Doty | 180/287 |
| 3,634,880 | 1/1972 | Hawkins | 340/63 |
| 3,907,060 | 9/1975 | Burton et al. | 180/287 |
| 3,983,534 | 9/1976 | Goodman | 340/428 |
| 4,063,610 | 12/1977 | Shilling | 180/114 |
| 4,749,873 | 6/1988 | Mutob et al. | 307/10 |
| 4,805,722 | 2/1989 | Keating et al. | 180/287 |
| 4,831,278 | 8/1989 | Ueda et al. | 307/10.1 |
| 4,914,314 | 4/1990 | Hirtz | 307/10 |
| 4,945,872 | 8/1990 | Embry | 123/146 |
| 4,958,084 | 9/1990 | Carlo et al. | 307/10.2 |
| 4,992,670 | 2/1991 | Pastor | 307/10.3 |

*Primary Examiner*—John K. Peng
*Assistant Examiner*—Daryl Pope
*Attorney, Agent, or Firm*—Vinson & Elkins L.L.P.

[57] ABSTRACT

An antitheft system for use with a vehicle. The vehicle used with the system has a battery for providing a constant voltage source and a ground reference, and an electrically-controlled operational feature, wherein activation of the feature is necessary for operating the vehicle. The system includes a first harness connector with a plurality of contacts for connecting to a second harness connector having corresponding contacts. The second harness connector is connected to a security module having antitheft functions. The plurality of contacts of the first harness connector includes a first contact for connecting to circuitry in the vehicle for providing an activating signal to activate the operational feature. Also included is a second contact connected to a terminal of the electrically controlled operational feature, where the terminal is for receiving the activating signal to activate the operational feature. Also included are a third contact connected to the constant voltage source and a fourth contact connected to the ground reference. A group of security modules are also disclosed, each providing a primary antitheft function, and additional and differing secondary antitheft functions. Certain secondary antitheft functions including audible and visual indicators of the state of the antitheft system. Other secondary antitheft functions include door, hood and trunk detectors. Still other secondary antitheft functions are provided.

16 Claims, 4 Drawing Sheets

ANTITHEFT SYSTEM FOR USE WITH A VEHICLE

TECHNICAL FIELD OF THE INVENTION

This invention relates in general to antitheft systems, and more particularly to a system for use with a motor vehicle or the like.

BACKGROUND OF THE INVENTION

As the use and costs of automobiles have increased, unfortunately so has the occurrence of automobile vandalization and theft. These undesirable consequences have serious effects on both owners and sellers of automobiles. As a result, for many years there has been considerable effort to improve upon systems for detecting vandalization or attempted theft of an automobile. These systems span greatly from exterior surveillance systems to interior-mounted electronic systems, each of which have their various virtues and pitfalls. Another unfortunate trend has been that regardless of the deterrent or detection scheme implemented, automobile thieves have adapted themselves to thwart the efforts of the protective system. Therefore, a need has arisen to protect the interests of both automobile consumers and sellers against damage or theft of an automobile, while improving upon existing antitheft systems.

Numerous internally-wired systems have been developed for purposes of foiling an automobile thief. These attempts have ranged from the more simple to the more sophisticated. For example, U.S. Pat. No. 4,063,610, issued to Shilling on Dec. 20, 1977, illustrates a relatively simple system which includes a manual switch connected to disable the ignition system of an automobile. Specifically, the switch is wired between the ignition switch and coil primary of an automobile. The switch is concealed so that it is not readily viewable or accessible by a person unaware of its existence. An operator, having knowledge of the switch, may change its position to either disconnect or connect the ignition switch and primary coil. As a result, the automobile is capable of being started only if the switch is in its activated position. Thus, the system illustrated in the '610 patent provides a simple mechanism for attempting to prevent theft of the automobile. Unfortunately, the system has many shortcomings. For example, a more sophisticated automobile thief may know to search for a secluded switch or like device. If the thief is able to locate the switch, then he or she may simply activate it as would the operator or owner of the vehicle. Further, the system provides only a disable feature, with no other deterrent or warning mechanisms. In addition, the system is permanently installed within the vehicle and provides no flexibility for adding improved features to it.

As an example of a fairly complicated antitheft system, U.S. Pat. No. 4,805,722, issued to Keating et al., on Feb. 21, 1989, illustrates a magnetically or optically encoded card-based system. The card is inserted into a card reader mounted in the vehicle to limit operation of the vehicle. The computer checks the authorization provided by the card, and if there is not proper authorization, the vehicle ignition and fuel line are blocked and the hood is locked, thereby prohibiting an attempt to start the vehicle, as well as an effort to circumvent the security system by bypassing it. As a result, a fairly sophisticated system is provided in an effort to deter or prohibit a thief from having unauthorized access to the vehicle. While the system illustrated in the '722 patent is therefore more complicated and, hence, more difficult to circumvent, it too may fail to satisfy the needs and desires of either the consumer or seller of an automobile. For example, the consumer is forced to always retain a magnetic or optical card, without which they have no authorization for operating their own vehicle. Further, the system provides no flexibility or upgradeability to include other desirable features. In addition, a great deal of labor would be necessary to remove the system if either a seller or consumer does not desire to have it in their vehicle.

It is therefore an object of the present invention to provide an antitheft system which is not easily circumvented by a thief or vandal.

It is a further object of the present invention to provide an antitheft system which does not mandate the need for a single controlling device such that if the true owner of the vehicle loses or misplaces the device, he or she is not prevented from operating the vehicle.

It is still a further object of the present invention to provide an antitheft system which is upgradeable to permit more sophisticated features where desirable.

It is yet another object of the present invention to provide a mechanism for use with an antitheft system such that a seller of the vehicle may accommodate various different types of peripheral modules, each of which provides differing antitheft functions.

It is another object of the present invention to provide a mechanism for quickly and conveniently disconnecting the entire alarm system from the vehicle so that it may be removed if a purchaser of the vehicle does not wish to have an antitheft system included within the vehicle.

It is still another object of the present invention to include an apparatus which may either be bypassed for providing no antitheft features, or which may accommodate a security module for providing a selected group of antitheft features.

Other objects and advantages of the present invention will be apparent to those of ordinary skill in the art having reference to the following specification together with its drawings.

SUMMARY OF THE INVENTION

In accordance with the present invention, an antitheft system for use with a vehicle is provided which substantially reduces the disadvantages and problems associated with prior antitheft systems, and seeks to further the objects set forth above.

The preferred embodiment of the present invention includes an antitheft system for use with a vehicle. The vehicle used with the system has a battery for providing a constant voltage source and a ground reference, and an electrically-controlled operational feature, wherein activation of the feature is necessary for operating the vehicle. The system includes a first harness connector with a plurality of contacts for connecting to a second harness connector having corresponding contacts. The second harness connector is connected to a security module having antitheft functions.

The plurality of contacts of the first harness connector includes a first contact for connecting to circuitry in the vehicle for providing an activating signal to activate the operational feature. Also included is a second contact connected to a terminal of the electrically controlled operational feature, where the terminal is for receiving the activating signal to activate the operational feature. Also included are a third contact connected to the constant voltage source and a fourth contact connected to the ground reference.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–6 of the drawings, like numerals being used for like and corresponding parts of the various drawings.

Figure 1:
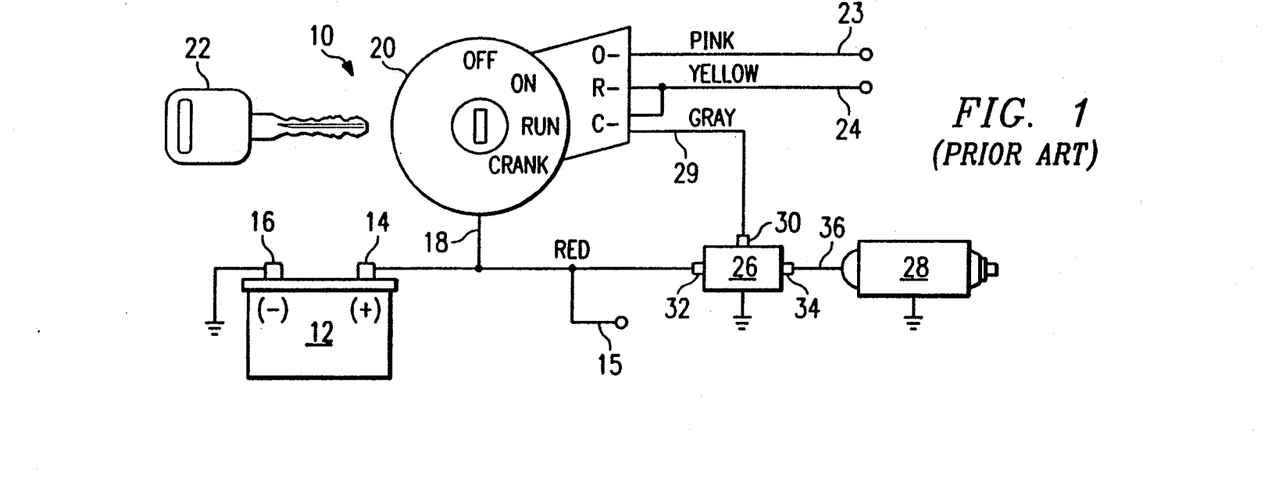
FIG. 1 illustrates a schematic of a prior art ignition system.

FIG. 1 illustrates a schematic of a prior art ignition system, denoted generally at 10. Ignition system 10 is a common example of the configuration used in an automobile. Specifically, ignition system 10 includes a battery 12 having a positive terminal 14 and a negative terminal 16. Battery 12 provides a nominal 12-volt DC power supply for ignition system 10 between terminals 14 and 16. A constant supply conductor 15 is connected to positive terminal 14 at battery 12. Typically, conductor 15 is colored red. Commonly, vehicle components which may require a power supply when the vehicle either is, or is not, operating are connected to receive power from conductor 15. For example, quite often the headlights or emergency flasher lights of an automobile are needed even if the vehicle is not operating. As a result, these types of components may be connected to conductor 15, or a similar conductor or device which receives its power from conductor 15, in order to supply power to those components even when the vehicle is non-operational.

Positive terminal 14 of battery 12 is connected to an input 18 of an ignition switch 20. Negative terminal 16 is connected to ground. Ignition switch 20 is an electromechanical switching device which communicates with a key 22 according to principles known in the art. Ignition switch 20 typically includes three output positions labeled "ON", "RUN" and "CRANK", respectively. Accordingly, and as is known in the art, key 22 is inserted into ignition switch 20 and turned typically in a clockwise fashion to operate ignition switch 20.

When rotating key 22 clockwise, the first position encountered is the "ON" position. For illustrative purposes, a low power conductor 23 is shown as connected to an output corresponding to the ON position of ignition switch 20. Low power conductor 23 is commonly colored pink. Moreover, the ON position of switch 20 provides a low current 12-volt signal to various devices coupled to conductor 23. Thus, some typical devices coupled to conductor 23 include dashboard check lights and the vehicle radio.

The second position encountered when rotating key 22 clockwise is the "RUN" position. The RUN position is the common position of key 22 during normal driving operations of the motor vehicle containing ignition system 10. For illustrative purposes, a high power conductor 24 is shown as connected to an output corresponding to the RUN position of ignition switch 20. High power conductor 24 is commonly colored yellow. When ignition switch 20 is turned to the RUN position, a high-power 12-volt supply is provided via conductor 24. Further, although conductor 24 is shown emanating from ignition switch 20, it should be understood that the high power source is likely to be from an automobile alternator and generator, and may not be directly connected to switch 20. Instead, switch 20 may operate a secondary device which connects the high power current source to conductor 24. In any event, various peripherals of the vehicle which require larger amounts of current may be driven by conductor 24. For example, an air conditioner or heater element commonly requires a larger amount of current and, therefore, may be electrically connected to the current supply by conductor 24.

The farthest clockwise position on ignition switch 20 is the "CRANK" position. The CRANK position is selected by turning key 22 when it is desirable to start the engine (not shown) of the vehicle containing ignition system 10. The crank output of ignition switch 20 is connected via a crank conductor 29 (commonly colored gray) to the control input 30 of solenoid 26. A power input 32 of solenoid 26 is connected to positive terminal 14 of battery 12. A power output terminal 34 of solenoid 26 is connected to the power input 36 of starter motor 28. In general, the CRANK position causes power to be connected to a solenoid 26 which drives a starter motor 28. Specifically, once key 22 is turned fully clockwise, ignition switch 20 connects positive voltage from battery terminal 14 through switch 20 to crank conductor 29. As a result, a positive cranking voltage is communicated via conductor 29 to control input 30 of solenoid 26. As is known in the art, solenoid 26 includes a switching device which is responsive to receiving a voltage at control input 30. Thus, upon receipt of a positive voltage along conductor 29, solenoid 26 switches to connect its power input 32 to its power output 34. Thus, this internal action of solenoid 26 acts to connect positive battery terminal 14 through solenoid 26 to power input 36 of starter element 28. Accordingly, once solenoid 26 is so activated, power is supplied to starter motor 28, thereby activating starter element motor 28 to engage and crank the engine of the vehicle.

Figure 2:
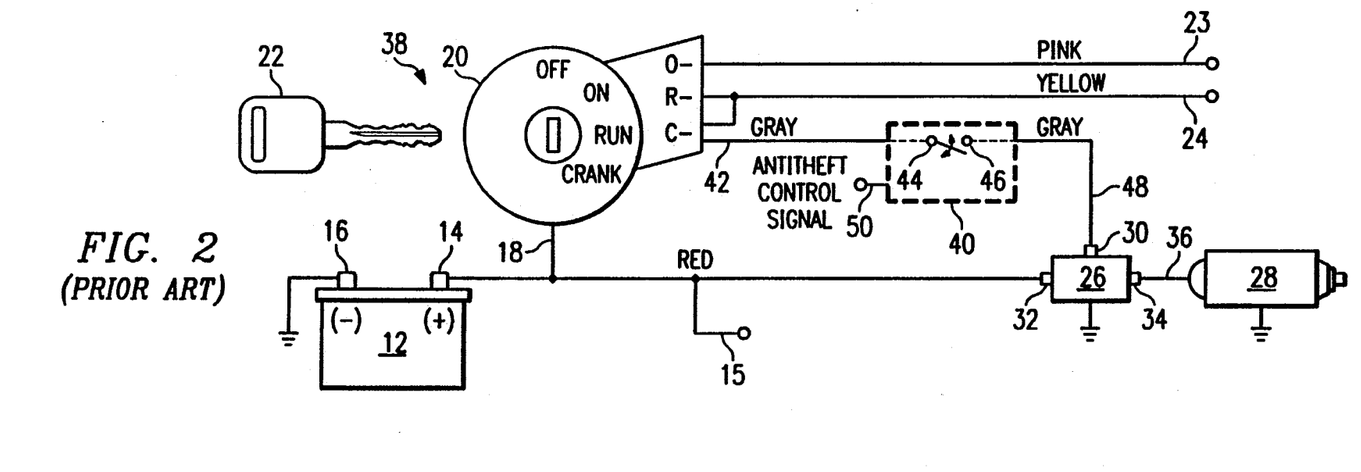
FIG. 2 illustrates a schematic of a prior art ignition system having a switch for disabling the starter solenoid activation signal.

FIG. 2 illustrates a schematic of a prior art antitheft system denoted at 38. Prior art antitheft system 38 is configured within a prior art ignition system and, therefore, includes the components illustrated in FIG. 1, above. Accordingly, for corresponding items, corresponding reference numerals are carried forward from FIG. 1 into FIG. 2. For example, prior art antitheft system 38 includes an ignition switch 20 which is actuated by a key 22. Again, ignition switch 20 receives a positive voltage from a battery 12 in order to drive a solenoid 26 and a starter motor 28. One significant difference in FIG. 2, however, is the inclusion of an antitheft switching device 40. Specifically, the crank signal produced by ignition switch 20 is connected from ignition switch 20 via an input crank conductor 42 to a pole 44 of switching device 40. The throw 46 of switching device 40 is connected via an output crank conductor 48 to control input 30 of solenoid 26. Thus, in comparing FIG. 2 to FIG. 1, it may be appreciated that switching device 40 is effectively spliced into what is illustrated as crank conductor 29 in FIG. 1. Accordingly, if switching device 40 were spliced in the manner described, then both conductors 40 and 48 are commonly colored gray.

Antitheft switching device 40 further includes a control input terminal 50. Control input terminal 50 receives an input actuating signal which switches the internal switch of switching device 40. Thus, the magnitude of this actuating signal causes the switch 40 to either open or close. From the illustration in FIG. 2, it should be appreciated that when switch 40 is closed, the operation of antitheft system 38 is identical to that of ignition system 10 shown in FIG. 1. In other words, if the switch is closed, input crank conductor 42 may communicate through the switch to output crank conductor 48. As a result, the cranking voltage provided by ignition switch 20 may be coupled to solenoid 26. Thus, when switching device 40 is closed, the ignition system illustrated in FIG. 2 will operate in the fashion of FIG. 1 and, hence, the antitheft system is "disarmed". If, however, an antitheft mode of operation is desired, then a signal is provided to control input terminal 50 to cause switching device 40 to open. In this instance, the antitheft system is activated or "armed" against theft. Thus, once switching device 40 opens, a cranking voltage provided by ignition switch 20 is prevented from reaching solenoid 26. Thus, even if a user were to advance key 22 clockwise to the cranking position, the opened position of switching device 40 would prevent a cranking voltage from reaching solenoid 26 and, therefore, would also prevent starter motor 28 from being activated.

The antitheft control signal provided to input terminal 50 may be derived in many ways known in the art. For example, one known mechanism is to provide a remote control system to an operator of a vehicle, including a handheld transmitter retained by the operator, and a receiver installed in the vehicle. The remote control system operates such that the user may depress a button on the transmitter, thereby communicating a signal to the receiver installed within the vehicle. This signal either arms or disarms the system and, therefore, either opens or closes switching device 40, respectively. In other words, if the operator wishes to arm the system, he or she depresses the transmitter button once and, upon receiving the transmitted signal, the receiver and associated circuitry cause switching device 40 to open. As a result, antitheft system 38 is armed, meaning that it is in a mode which prevents solenoid 26 and starter element 28 from being activated, even if key 22 is turned to the cranking position. Thus, in this armed state, a thief is unable to properly start the vehicle, even if ignition switch 20 is forced to the cranking position.

In order to disarm antitheft system 38, the transmitter button is again depressed, thereby communicating to the receiver the user's desire to disarm the antitheft system. Upon receipt of this communication, the receiver and associated circuitry provide a signal to control input 50, thereby causing switching device 40 to close. Once switching device 40 is closed, the ignition system in FIG. 2 may operate properly. Thus, ignition switch 20 is properly connected so that it will operate in a normal fashion, and solenoid 26 and starter motor 28 may be activated.

From a review of FIG. 2, therefore, it may be appreciated that it is well known in the art to permanently install or hard-wire a switching device into an ignition system, and to interrupt a voltage which would otherwise activate a starter solenoid and, hence, a starter motor. In addition, other examples exist in the art for interrupting various other types of features which may be necessary in order to either commence operation or continue operation of a motor vehicle. For example, U.S. Pat. No. 4,945,872, issued to Embry on Aug. 7, 1990, and incorporated fully herein by reference, illustrates a system whereby a manual jumper device may be used to either interrupt or connect various different points within an ignition system. As illustrated in FIG. 2 of the '872 patent, one of the points contemplated as interrupted is the connection between the ignition switch and the starter solenoid. The '872 patent, however, illustrates additional possibilities for interrupting necessary operational features for an automobile. One example is interrupting power to the engine primary coil. Another example is interrupting power to the engine distributor system. As yet another example, U.S. Pat. No. 4,914,314, issued to Hirtz on Apr. 3, 1990, and incorporated fully herein by reference, discusses a prior art system which, when armed, interrupts an electrical signal used to operate a fuel injector. Accordingly, once armed, the system described in the '314 patent disconnects the electrical control signal which otherwise causes the fuel injector to operate. By deactivating the fuel injector, the automobile engine is rendered inoperative. Further, as pointed out in the '314 patent, other vehicle operations, such as ignition timing or fuel pump operations, also could be interrupted in order to prohibit normal operation of the vehicle and, likewise, seek to prohibit theft of the automobile.

While each of the systems above, therefore, illustrate mechanisms for interrupting any of numerous different electrically controlled operational features of a vehicle, each provides various shortcomings and pitfalls. As one example, in each of the systems described, it is contemplated that the antitheft system be permanently installed within the automobile, thereby preventing the ability to upgrade the system without completely removing the existing system and installing a new system. As such, the removal would require considerable time, labor and expense in that many wires within the automobile would have to be cut and reconnected in manners known to those skilled in the art. Further, in some of the above examples, there is no quick way for bypassing the system in an instance such as where a purchaser does not desire to have an antitheft system. The embodiments of the present invention, however, overcome these disadvantages and further provide advantages to both consumers and sellers of automobiles. Specifically, with respect to the consumer, the embodiments of the present invention provide great flexibility in allowing an antitheft system to be upgraded to provide additional antitheft functions. With respect to both the consumer and the seller of an automobile, the present invention allows this upgradeability to be easily facilitated and, therefore, reduces the cost and labor incurred by both the seller and the consumer. Yet another advantage of the present embodiment provides for an easy elimination of all antitheft functions if the purchaser or consumer of the vehicle so desires. Moreover, this feature may be performed quickly and inexpensively and, as a result, benefits both the seller and purchaser of the automobile.

Figure 3:
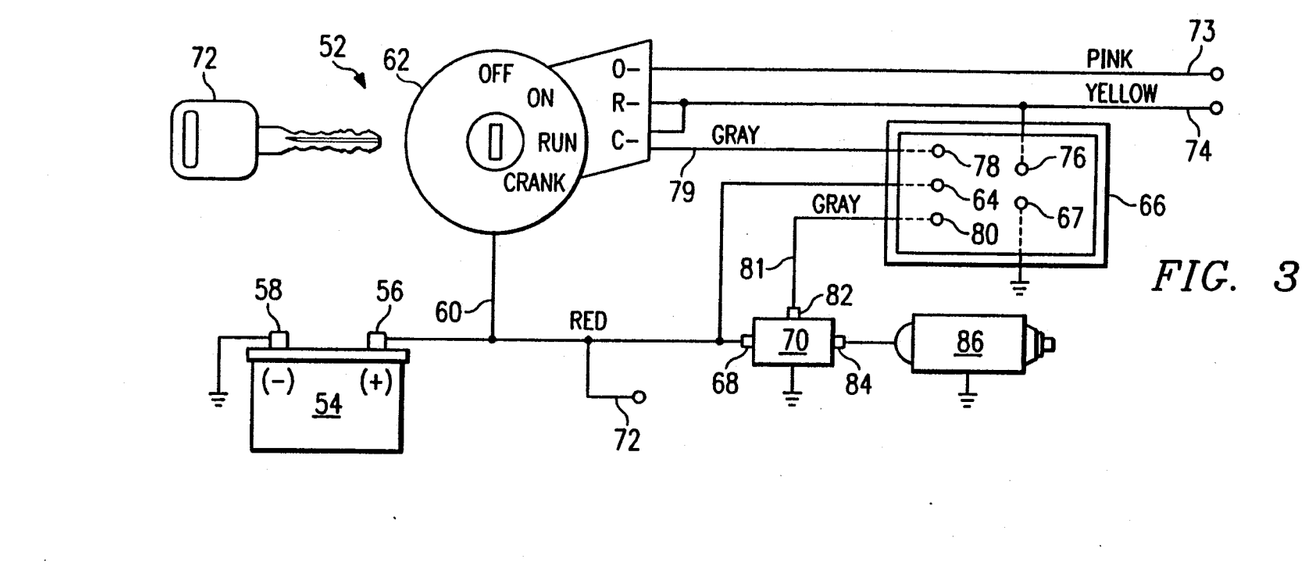
FIG. 3 illustrates a schematic of one aspect of the preferred embodiment of the present invention, including an ignition system having a harness connector disposed within an ignition system of a motor vehicle.

FIG. 3 illustrates a schematic of the preferred antitheft system of the present invention, designated generally at 52. Antitheft system 52 is illustrated and preferably implemented in connection with an automobile ignition system. Accordingly, many of the components illustrated in FIG. 1 are again illustrated in FIG. 3. Specifically, antitheft system 52 includes a battery 54 having a positive terminal 56 and a negative terminal 58. Positive terminal 56 is connected to a power supply input 60 of an ignition switch 62. In contrast to FIG. 1, however, in the present invention, positive terminal 56 is also connected to a positive voltage supply pin 64 of a wiring harness connector 66. In addition, positive terminal 56 is further connected to a power input 68 of a solenoid 70 and to a constant supply conductor 72. Negative terminal 58 of battery 54 is connected to ground.

Ignition switch 62 is the same as ignition switch 20 illustrated above and, therefore, communicates with a key 72 so that switch 62 may be rotated to one of three positions, labeled "ON" "RUN" and "CRANK" respectively. Again, operation of ignition switch 62 causes various output voltages, including a low power voltage on a pink low power conductor 73 when ignition switch 62 is turned to the ON position, and a high power voltage on a yellow high power conductor 74 when ignition switch 62 is turned to the RUN position. Like conductor 23 of FIG. 1, conductor 73 provides a low current 12-volt voltage for driving various automobile components which require power when the vehicle is on, such as the vehicle radio. Similarly, like conductor 24 of FIG. 1, conductor 74 provides a high current 12-volt voltage for driving various automobile components which require larger amounts of currents, such as air conditioners or the like. In the preferred embodiment of the present invention, however, conductor 74 is further connected to a high power voltage pin 76 of wiring harness connector 66.

Ignition switch 62 provides a cranking voltage to an input cranking conductor 79 when switch 62 is turned to its CRANK position. Conductor 79 is further connected to an input activation signal pin 78 of wiring harness connector 66. Accordingly, activation signal pin 78 receives the cranking or activating signal produced by ignition switch 62. Further, wiring harness connector 66 includes an output activation signal pin 80. In the preferred embodiment, output activation signal pin 80 is connected via an output cranking conductor 81 to a control input 82 of solenoid 70. Accordingly, output activation signal pin 80 may receive an activating, or cranking, signal which will activate solenoid 70. Specifically, solenoid 70 includes a power output 84 connected to provide power to a starter motor 86. Accordingly, if an activation signal is provided to control input 82, solenoid 70 connects its power input 68 to its power output 84, thereby allowing the 12-volts supplied from battery 54 to pass through solenoid 70 and operate starter motor 86.

The general operation of the preferred antitheft system 52 is as follows. System 52 provides a unique mechanism for either upgrading or bypassing an antitheft system in an automobile. In particular, given the configuration illustrated in FIG. 3, various different types of devices may be connected to wiring harness connector 66 in order to provide antitheft features, or in the alternative, to eliminate any antitheft functionality of the system. As such, a seller of an automobile may incorporate the configuration of FIG. 3 into the automobile's ignition system. Once the system is so configured, the seller may solicit a purchaser's desires with respect to antitheft features. In one aspect discussed in greater detail below, if the purchaser desires to have no antitheft features, then a second connector is simply and inexpensively plugged into wiring harness connector 66 to bypass the antitheft features. If, however, the purchaser of the automobile desires a certain level of antitheft functions, then a connector coupled to a module for providing those functions may be connected to wiring harness connector 66. Moreover, as described in greater detail below, the present invention provides for more than one user-selectable and interchangeable security module, where each of the modules includes a primary level of antitheft protection functionality, as well as providing a secondary set of additional antitheft functions. Thus, a seller of an automobile may select the appropriate security module which provides the level of antitheft features desired by the purchaser.

The flexibility of the present invention may prove to be of great financial advantage to both sellers and purchasers of automobiles. Specifically, the purchaser is benefited in that he or she need not pay for permanently installed antitheft features previously wired into the electrical system of the automobile. In addition, the purchaser is given the opportunity to select a subset of features from a lengthy list of antitheft functions. With respect to the seller of the automobile, only the minimum and inexpensive configuration illustrated in FIG. 3 need be installed in a vehicle prior to negotiating with the purchaser. Once the purchaser has selected a series of antitheft functions that are desired, if any, then the seller may include those in the system by choosing an appropriate module supporting those functions and connecting it to wiring harness connector 66.

Figure 4:
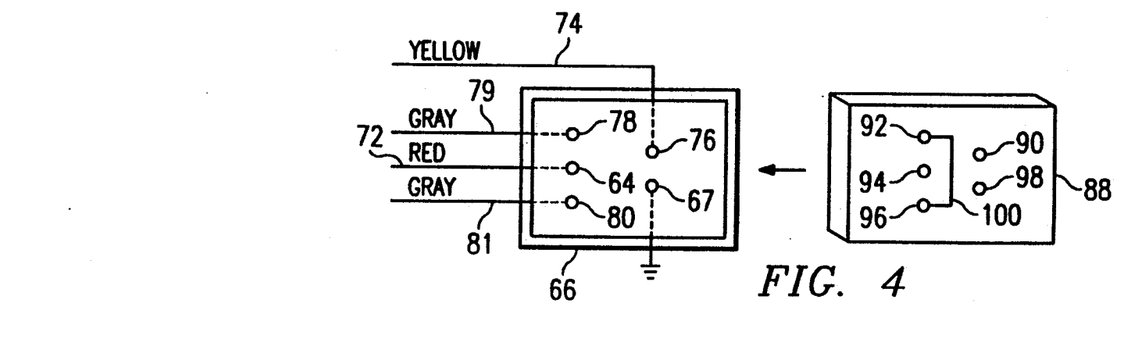
FIG. 4 illustrates a jumper connector which is mateable with the connector illustrated in FIG. 3 for bypassing the antitheft capabilities of the system in the instance that antitheft functionality is not desired.

FIG. 4 illustrates connector 66 as shown in FIG. 3, as well as a rear perspective view of a bypass connector 88. Bypass connector 88 is mateable with harness connector 66 and, preferably, also includes five pins, 90, 92, 94, 96, and 98. Thus, when connector 88 is mated with connector 66, the pins of connector 66 contact respective pins of connector 88. Specifically, pin 76 contacts pin 90, pin 78 contacts pin 92, pin 64 contacts pin 94, pin 80 contacts pin 96 and pin 67 contacts pin 98.

In the preferred embodiment, a jumper conductor 100 is provided which connects pins 92 and 96 of bypass connector 88. Accordingly, it should be appreciated that once bypass connector 88 is connected to harness connector 66, the effect of jumper connector 100 is to connect pins 78 and 80 of harness connector 66 together. From a review of FIG. 3, it should therefore be appreciated that this connection effectively couples input and output cranking conductors 79 and 81 together. As a result, the cranking voltage provided by ignition switch 62 may pass through bypass connector 88 to activate solenoid 70. Thus, if a user were to insert bypass connector 88 into harness connector 66, and then turn ignition switch 62 to the CRANK position, a cranking voltage is provided from ignition switch 66 through the combination of harness connector 66 and bypass connector 88 to control input 82 of solenoid 70. As a result, solenoid 70 is activated, thereby supplying power to starter motor 86 and allowing the user to start the vehicle engine.

Thus, in one aspect of the present invention, bypass connector 88 is provided which facilitates a bypass of any antitheft functions. This feature provides advantages again to both a seller and a purchaser of an automobile. For example, the seller may install the system illustrated in FIG. 3 in each of his vehicles to be sold. With no additional connections, a thief is unable to operate the motor vehicle because wiring harness connector 66 prevents the cranking voltage from being conducted from ignition switch 62 to solenoid 70. As a result, the seller of the automobile has a first level of antitheft protection for vehicles which remain in his or her sales inventory. If, however, the seller of the automobile desires to start the car, then a bypass connector 88 is inserted into harness connector 66, thereby allowing proper activation of the ignition system. As will be described in greater detail below, as an alternative option, any of a series of modules may be selected to couple with harness connector 66 for providing alternative antitheft functions. If a consumer of the vehicle, however, does not desire these antitheft functions, then the seller need only bypass the system, and the option for antitheft features is bypassed for the consumer to meet his or her desire that the system not be equipped with antitheft features.

Figure 5:
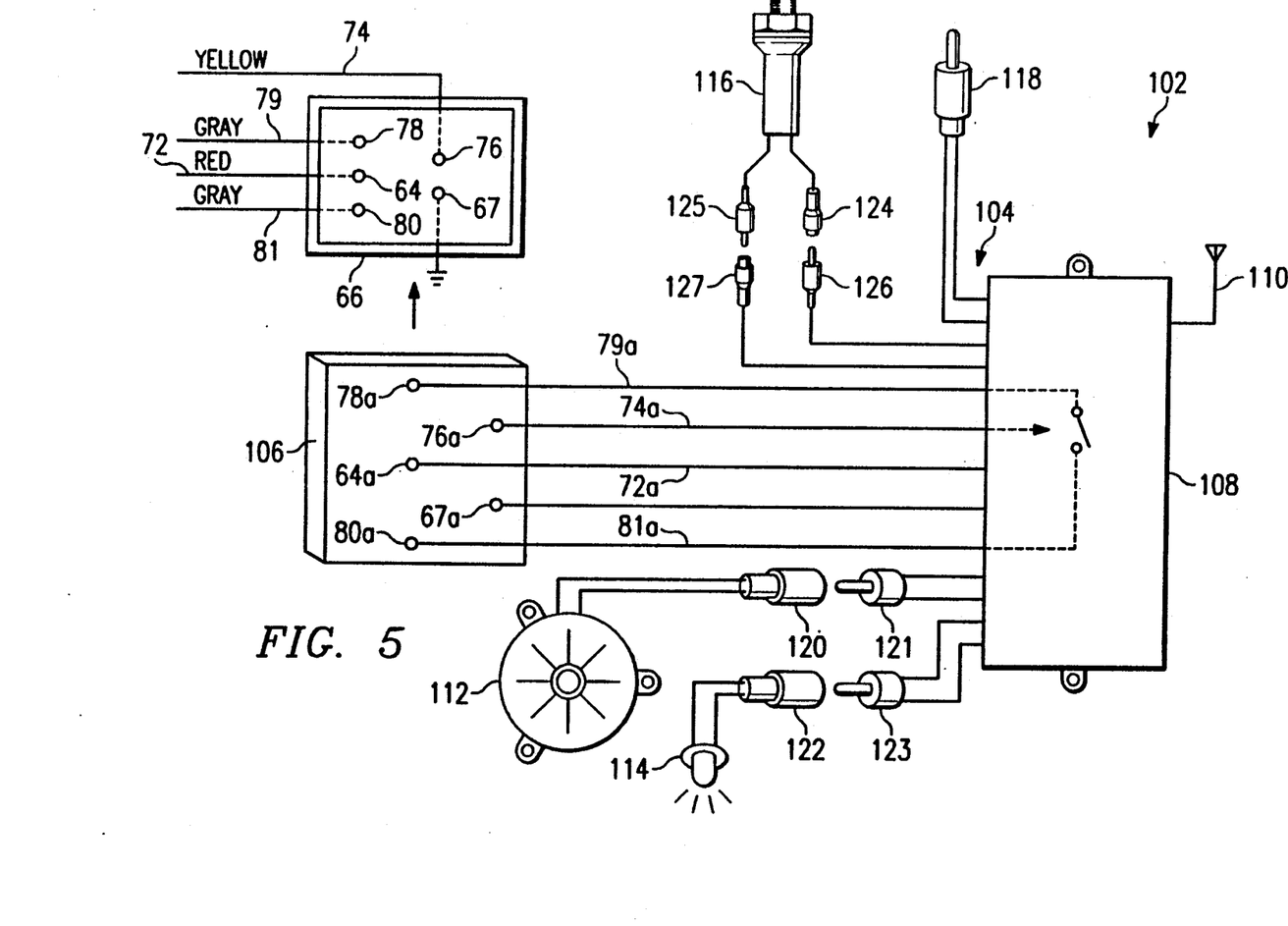
FIG. 5 illustrates a schematic of a user-selectable and interchangeable security module providing various antitheft features and having a connector mateable with the connector illustrated in FIG. 3.

FIG. 5 illustrates harness connector 66 of antitheft system 52 shown in FIG. 3, as well as a security system 102 having several antitheft functions. Security system 102 includes a wiring harness 104 which connects in certain instances to a harness connector 106. Harness connector 106 is physically compatible to mate with harness connector 66 of antitheft system 62. Accordingly, harness connector 106 includes a series of pins which correspond on a one-to-one basis to the pins of harness connector 66. For purposes of illustration, each pin of harness connector 106 is labeled with a reference numeral corresponding to the respective contacting pin of harness connector 66. Thus, when connectors 66 and 106 are brought together, pin 78 of connector 66 contacts pin 78a of connector 106. This labeling is carried forth for all other pins of connectors 66 and 106 and, thus, pin 64 contacts pin 64a, pin 80 contacts pin 80a and so forth. Therefore, connection of connectors 66 and 106 permits antitheft system 52 to communicate with a security module 108 which, in the preferred embodiment, provides a series of antitheft functions to the vehicle. Thus, from a review of FIGS. 4 and 5, it may be appreciated that rather than bypassing the antitheft system as described in connection with FIG. 4, a security module 108, or the like, may be included which supports the various antitheft functions described in greater detail below. As a result, the present invention provides an improved level of flexibility over prior art systems in that both the seller of the automobile, as well as the consumer, may choose to equip the automobile with antitheft features or bypass the antitheft features.

The specific componentry and functions associated with security module 108 are as follows. Within module 108 are various different circuits necessary to support the functions described below. The specific circuitry within module 108 is commercially available from the AudioVox Corporation, located in New York, N.Y., and is identified by Part No. RK1. In general, security module 108 provides one primary antitheft function, as well as several secondary antitheft functions.

As a primary antitheft feature, module 108 includes circuitry for opening and closing a switching device similar to that illustrated in FIG. 2 above. More particularly, wiring harness 104 includes two individual conductors 79a and 81a, each of which connects through connectors 106 and 66 to a respective crank conductor 79 and 81. For illustrative purposes, these conductors are labeled with reference numbers which correlate to the reference number of the respective conductor connected to harness connector 66. Thus, conductor 79 of harness connector 66 connects to conductor 79a of harness connector 106. Similarly, conductor 81 of harness connector 66 connects to conductor 81a of harness connector 106. Conductors 79a and 81a connect to a pole and throw of a relay switch (shown in phantom) within module 108 in a manner similar as conductors 42 and 48, respectively, shown in FIG. 2, above. It should be noted, however, that under normal use of the commercial product available from AudioVox, conductors 79a and 81a would be permanently installed with conductor 79a being directly connected to the cranking voltage output of a vehicle ignition switch and conductor 81a being directly connected to the control input of the starter solenoid. Under the present invention, however, conductors 79a and 81a are connected to respective pins within harness connector 106. These two pins correspond to pins 78 and 80 of wiring harness connector 66.

In view of the above, it should be appreciated that once harness connectors 66 and 106 of the preferred embodiment are brought together, the operation of the switching device within security module 102 can occur. This switching action operates to open and close the connection between pins 78a and 80a of harness connector 106. Because harness connector 106 is connected to harness connector 66, this switching action, therefore, also operates to open and close the connection between pins 78 and 80 of harness connector 66. Further, from FIG. 3, it also should be apparent that this opening and closing between pins 78 and 80 either prohibits or permits, respectively, the operation of solenoid 70 and starter motor 86. More specifically, when security system 102 is placed in an "armed" or antitheft state, the switch within module 108 opens and, therefore, pins 78 and 80 of harness connector 66 are not connected to one another. As a result, if an operator of the vehicle attempts to start it, then they are unsuccessful because the activation signal provided by ignition switch 62 cannot be connected to starter solenoid 70. As described in greater detail below, however, security module 108 may be disarmed by various different mechanisms. Once disarmed, the switching element within module 108 may close, thereby electrically connecting pins 78 and 80 of harness connector 66 together. Once connected, the ignition system of antitheft system 52 may operate properly. As a result, in this disarmed state, an operator may operate ignition switch 62, thereby allowing current to travel through conductor 79a to the switch within security module 108 and back through conductor 81a to control input 82 of solenoid 70. As a result, starter motor 86 is activated, thereby permitting the operator to start the engine associated with the vehicle containing the system.

As stated above, the switch within module 108 opens when security module 108 is armed, and may close when security module 108 is disarmed. More particularly, in the preferred embodiment, the closing of the switch occurs in response to two different signals. The first signal is an indication from one of various different mechanisms for arming or disarming security module 108. For example, one example is the combination of a remote control transmitter which communicates with a receiver within security module 108. Once the mechanism provides an initial indication that module 108 should be disarmed, then the switch is allowed to close, but does not close at that instant. More particularly, the switch closes when module 108 is disarmed and ignition switch 62 is subsequently turned to the CRANK position. Recall that conductor 74 provides a high power voltage when ignition switch 62 is turned to the crank position. Also note that conductor 74 communicates with module 108. Accordingly, the voltage on conductor 74 is used as a secondary signal to close the switch of module 108 if module 108 is disarmed. Thus, the switch may close upon receipt of the high power voltage from conductor 74 only if the module is also disarmed. This configuration is preferable in that the high power voltage provided by conductor 74 is preferred to actually perform the closing movement of the switch within module 108.

In contrast, it should be noted that once the selected mechanism provides an initial indication that module 108 should be armed, a control signal internal to module 108 opens the switch so the cranking signal cannot reach the solenoid. This action happens irrespective of the existence of a voltage on conductor 74. Thus, once module 108 is disarmed, the switch opens and a subsequent voltage on conductor 74 will have no effect on the switch and will not be connected to solenoid 70.

Module 108, in the preferred embodiment, further includes an external antenna 110. Antenna 110 communicates with a receiving circuit internal to module 108. Specifically, antenna 110 receives a signal from a corresponding transmitter, according to principles known in the art. The transmitter operates as the main mechanism for arming or disarming security module 108. Thus, the owner of the vehicle containing circuitry of FIG. 5 may carry a pre-programmed transmitter having a button which, when depressed, transmits a signal to antenna 110 which communicates the signal to the receiver within module 108. Preferably, each time the receiver receives a signal from the transmitter via antenna 110, security module 110 switches state between armed and disarmed. Thus, if the system is disarmed and the operator of the transmitter depresses a button on the transmitter, a signal is sent to security module 108 to arm the antitheft system. As stated above, in the armed state, the internal switch of security module 108 opens, thereby prohibiting an unauthorized user of the vehicle to start the ignition system. Further, if the operator depresses the transmitter button a second time, the system is disarmed and, therefore, the internal switch of security module 108 may be closed to allow normal ignition operation.

Security module 108 further includes circuitry for performing a set of secondary antitheft functions. Specifically, security module 108 also supports a piezo-electric sound element 112, an LED 114, a manual override switch 116 and a remote door-lock connector 118. Each of these devices is connected via the preferable conductors into wiring harness 104. For example, piezo-electric sound element 112 has a pair of conductors connected to a female plug member 120. Female plug member 120 is mateable with a male plug member 121 which is connected to wiring harness 104. As a result, piezo-electric sound element 112 may communicate with circuitry within security module 108. Specifically, security module 108 includes circuitry for causing piezo-electric sound element 112 to produce an audible signal when the state of security module 108 is changed. Thus, if a user operates the transmitter described above in order to arm the system, then an audible sound is produced via sound element 112. Similarly, if a user uses the transmitter to disarm the system, then an audible sound is likewise produced by sound element 112.

LED 114 is connected and operates in a manner similar to piezo-electric sound element 112. Accordingly, LED 114 is connected to a female connector 122 by a pair of conductors. Female connector 122 is mateable with a male connector 123 which is connected via a pair of conductors to wire harness 104. As a result, once plug members 122 and 123 are connected together, circuitry within security module 108 may activate or deactivate the illumination of LED 114. Further, illumination of LED 114 occurs in order to indicate the state of operation of the antitheft system in the same manner as sound element 112. Thus, when the system is armed, LED 114 illuminates, and when the system is disarmed, LED 114 is turned off. As a result, LED 114 provides the owner/operator of the vehicle with a visual indication of the state (i.e., either armed or disarmed) of the antitheft system. In addition, LED 114 acts as a deterrent to potential thieves who recognize the significance or warning effect created by LED 114.

Remote door-lock connector 118 is also connected via a pair of conductors to wiring harness 104. Moreover, remote door-lock connector 118 is mateable with an electrical receptacle commonly provided with many automobiles having electric door locks. If, however, an automobile is equipped with electric door locks not having a mateable connector, then the conductors leading to connector 118 may be spliced into the wiring driving the electric door lock on the automobile. In any case, remote door-lock connector 118 operates to provide a locking/unlocking signal to the electric door locks of the automobile. More specifically, the lock/unlock signal corresponds to the state of operation of security module 108 much like the operation of sound element 112 and LED 114. Thus, when an operator arms the security system, a signal is provided by circuitry within housing 108 to connector 118 such that the locks on the doors of the automobile are automatically locked concurrently with the arming of the system. Likewise, when the operator of the system disarms security module 108, an unlock signal is provided by connector 118, thereby unlocking the electric door locks of the vehicle.

As a final secondary antitheft feature in the preferred embodiment of FIG. 5, a manual override switch 116 is connected via a pair of conductors to wiring harness 104. In the preferred embodiment, each of the conductors has a corresponding plug member 124 and 125. Further, the conductors within wiring harness 104 which communicate with these conductors have mateable plugs 126 and 127, respectively. Manual override switch 116 may be operated as a secondary mechanism for arming or disarming security module 102 as follows. Switch 116 is mounted somewhere within the vehicle at a location which is not readily obvious to a person unfamiliar with the vehicle, but which is still accessible by the driver. For example, switch 116 may be mounted underneath the dashboard or seat on the driver's side of the vehicle. Still other locations which are readily accessible, yet generally hidden from open view, are suitable for the mounting of switch 116. If for some reason an operator of a vehicle seeks to bypass the antitheft functionality of the system, he or she may depress the button on switch 116, thereby bypassing the anti-ignition system described above. In other words, depression of the button causes the switching element within security module 102 to close, thereby permitting current to flow from conductor 79 to conductor 81 and, hence, also permitting activation of the solenoid 70 and starter motor 86. Thus, if a user has misplaced or otherwise does not have access to the remote control transmitter described above, he or she may still bypass the operation of the antitheft system and start the vehicle engine by depressing switch 116 and operating ignition switch 62.

Figure 6:
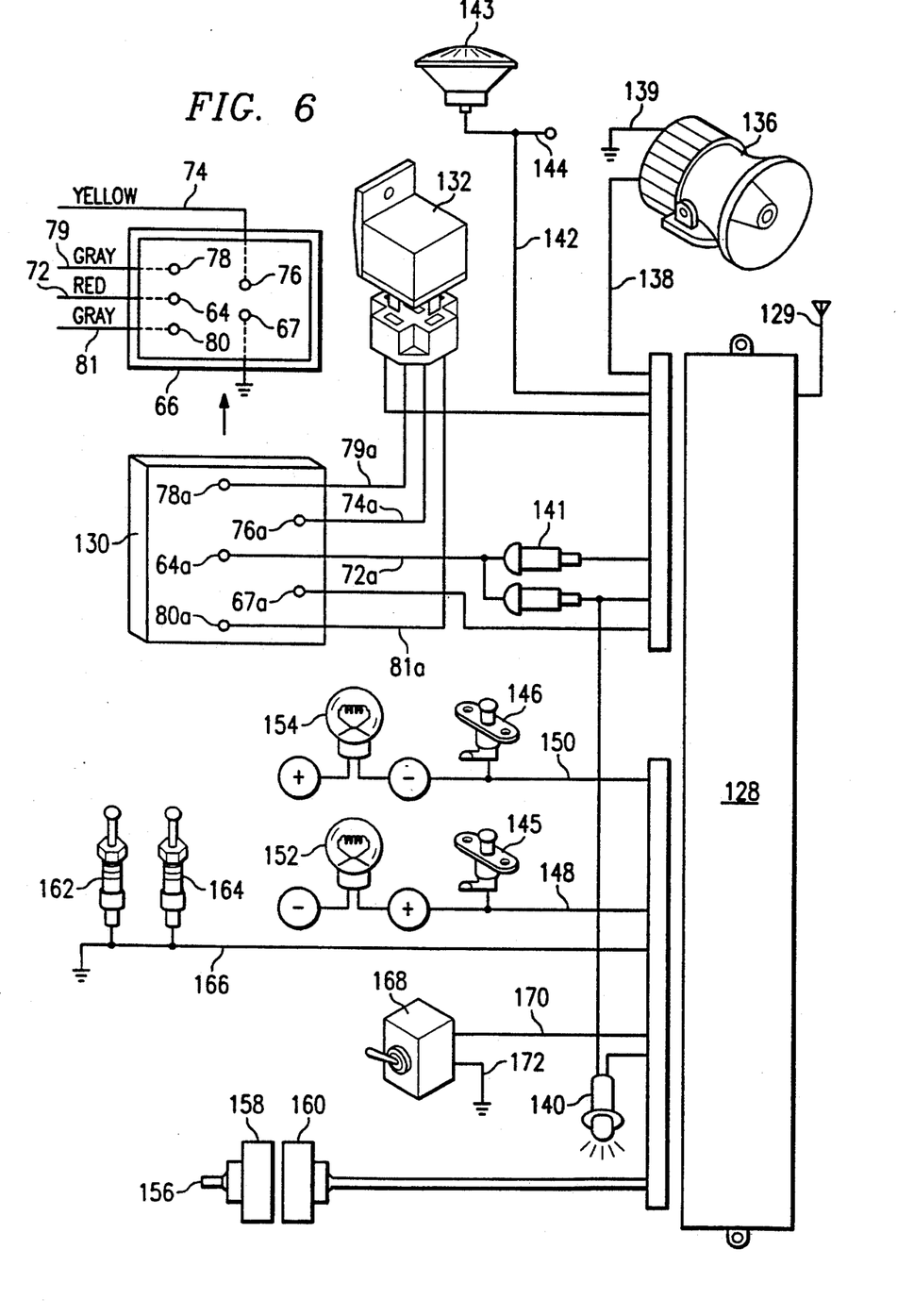
FIG. 6 illustrates a schematic of an alternative user-selectable and interchangeable security module having a connector mateable with the connector illustrated in FIG. 3, and further having a set of antitheft functions which differ in certain respects from the functions of the module illustrated in FIG. 5.

FIG. 6 illustrates a schematic of an alternative user selectable and interchangeable security module 128. Security module 128 includes various circuitry for providing both a primary, and secondary, antitheft functions, and is commercially available from the AudioVox Corporation as Part No. APS1. In the present invention, however, security module 128 is modified in the same manner as security module 102 and, therefore, includes a harness connector 130. This modification permits security module 128, and its supported antitheft functions, to interact and plug into wiring harness connector 66 illustrated above in connection with FIGS. 3-5. Thus, it should be appreciated that the entire system illustrated in FIG. 6 may easily be coupled to the inventive circuitry illustrated in FIG. 3, above, by plugging harness connector 130 into wiring harness connector 66. Once the systems are so connected, the various antitheft functions provided by security module 128, and discussed in greater detail below, may be achieved in the automobile including the entire system. Thus, again it should be appreciated that the system of FIG. 3 may be either bypassed as discussed in reference to FIG. 4 or improved to include various different security modules including, but not limited to, those illustrated in FIGS. 5 and 6. As a result, the system is highly flexible and upgradeable to the benefit of both a seller and a purchaser of an automobile.

The specific features and connections associated with security module 128 are as follows. As a primary security function, security module 128 communicates with a relay 132. Relay 132 is connected to conductors 79a and 81a, again corresponding to conductors 79 and 81, through harness connectors 130 and 66. In addition, relay 132 is connected via a conductor 74a to communicate with high power conductor 74 connected to harness connector 66. Relay 132 is also connected to security module 128 via a control conductor 134. In operation, relay 132 switches in the identical manner as the switching element within module 108 of FIG. 5. The significant difference is that relay 132 is external to module 128 rather than being internal as in the case of FIG. 5. Thus, in general, control conductor 134 either permits or prohibits the operation of relay 132. More specifically, when security module 128 is armed to prevent automobile theft, control conductor 134 provides a signal which deactivates relay 132. As a result, if a thief turns the ignition switch forward, although a positive voltage is received along conductor 74a to relay 132, relay 132 does not close due to the control signal on control conductor 134. If, however, security module 128 is disarmed, then the signal at control conductor 134 allows relay 132 to operate in normal fashion. A result, if the ignition switch of the vehicle is turned forward, then a positive voltage is received along conductor 74a, thereby causing the switching mechanism within relay 132 to close. As discussed above in connection with FIG. 5, the closing of the relay causes conductor 79a to be coupled to conductor 81a, and further permits current to flow to solenoid 70, thereby activating starter motor 86.

Security module 128 further supports a set of secondary antitheft functions. The secondary antitheft functions of security module 128, however, differ from those of security module 108 shown in FIG. 5. More specifically, the circuitry within security module 128 is more sophisticated and, therefore, permits greater flexibility and additional secondary antitheft features which are not included in, or supported by, security module 108. Thus, it should be appreciated that if a purchaser desires a more sophisticated security system, the seller may select security module 128 rather than security module 108. Once selected, module 128 is easily installed by placing connector 130 within connector 66, and wiring the remaining features illustrated in FIG. 6. These remaining features are discussed in greater detail immediately below.

Security module 128 is configured in the preferred embodiment to communicate with a transmitter in the same manner as security module 108 discussed above in connection with FIG. 5. Accordingly, security module 128 includes an antenna 129 which communicates with an internal receiver (not shown). Thus, as described above, the owner of the vehicle may carry a transmitter which includes at least one button which, when depressed, communicates to a receiver within security module 128 that the owner desires to arm or disarm the security system.

Security module 128 further includes circuitry for supporting a siren 136. Specifically, a power conductor 138 is connected between security module 128 and siren 136. Siren 136 is further connected to ground via a ground conductor 139. In operation, siren 136 provides two separate functions. As a first function, siren 136 includes a piezo-electric sound element which performs the same function as piezo-electric element 112, discussed above in connection with FIG. 5. Thus, when an operator arms security module 128, a small burst of sound is produced by the piezo-electric element within siren 136. Similarly, a second pulse of sound is created when security module 128 is disarmed. As a second function, siren 136 provides an alarm when security module 128 detects one of many different conditions which are indicative of either disturbance or attempted theft of the automobile. As discussed below, various other features are supported by security module 128 which detect these types of conditions. Accordingly, once a condition is detected, security module 128 provides a signal via power conductor 138 to siren 136, thereby causing the siren 136 to sound. In the preferred embodiment, siren 136 will continue to sound for a predetermined period on the order of ninety seconds. As a result, this sounding of siren 136 provides a warning to the true owner of the vehicle that an attempted theft or disturbance to the vehicle has occurred. In addition, the sound produced by siren 136 provides a deterrent to a thief or provides a mechanism in order to hopefully scare the thief away.

Security module 128 is also connected to an LED 140. Specifically, LED 140 is connected to one of two fuses in a fuse assembly 141. Fuse assembly 141 is connected to pin 64a of connector 130 via conductor 72a. Accordingly, fuse assembly 141 receives a constant supply of voltage from red conductor 72 connected to harness connector 66. The operation of LED 140 performs various functions. Specifically, LED 140 may flash at different frequencies to alert the vehicle operator of different events. One flash frequency indicates that security module 128 has been armed. A second flash frequency indicates that a manual override feature, described below, has been activated. A third flash frequency indicates whether security module 128, after having been armed, has detected a violation. A fourth flash frequency indicates whether a door of the vehicle has been opened. Finally, a fifth flash frequency indicates whether a secondary detector, such as a motion detector, has detected a violation.

Security module 128 is also connected via a power conductor 142 to the parking lamps 143 of the vehicle. Power conductor 142 is spliced into the existing power supply conductor 144 for parking lamps 143. This connection permits security module 128 to cause parking lamps 143 to flash under certain conditions. Specifically, parking lamps 143 are caused to flash when module 128 is either armed or disarmed via the remote control. Thus, when an operator is outside of the vehicle, he or she may depress the remote control button to arm or disarm security module 128, and this action is confirmed by a corresponding flashing of parking lamps 143.

Security module 128 is also configured to connect to the door pin detector mechanism typically included on an automobile for detecting when one of the doors of the vehicle has been opened. Moreover, security module 128 is configured in order to accommodate either positive output or negative output door switches. Thus, FIG. 6 illustrates a positive output switch 145 and a negative output switch 146. Each of switches 145 and 146 are connected to a signal conductor 148 and 150, respectively. Further, switch 145 is connected to the positive terminal of a dome light 152 having its negative terminal connected to ground. Similarly, switch 146 is connected to the negative terminal of a dome light 154 having its positive terminal connected to a power supply. The normal operation of positive output door switch 145 and dome light 152 is as follows. Output switch 145 is connected to the positive DC voltage available in the vehicle. Under normal operations (i.e., door closed), output switch 145 is opened and, therefore, no voltage is provided to the positive terminal of dome light 152. If, however, a door is opened, output switch 145 closes, thereby providing a positive voltage to the positive terminal of dome light 152, and further causing dome light 152 to illuminate. In addition, signal conductor 148 receives this positive voltage and transmits it to security module 128. If security module 128 is armed, then an indication is received that an unauthorized opening of a door has occurred. As a result, security module 128 responds by performing whatever function it is configured to perform upon detection of an attempted theft or disturbance of the vehicle. For example, upon this type of detection, a signal is provided via power conductor 138 to siren 136, thereby causing siren 136 to sound, as discussed above.

The operation of negative output door switch 146 is similar to that of positive output door switch 144, with the difference being that the polarity of conduction is reversed. Specifically, negative output door switch 146 is connected to ground. As a result, under normal operating conditions, switch 146 is open and, therefore, dome light 154 is not grounded and remains off. If, however, the door associated with switch 146 is opened, switch 146 closes, thereby providing a ground to dome light 154. As a result, dome light 154 illuminates. In addition, signal conductor 150 presents an indication to security module 128 which, if armed, responds by providing an alert that the door has been opened.

Security module 128 also supports a remote door lock connector 156. In the preferred embodiment, remote door lock connector 156 is connected to a plug member 158. Plug member 158 is mateable with a second plug member 160 connected to security module 128. Plug members 158 and 160 facilitate an easy installation of remote door lock connector 156. Specifically, remote door lock connector 156 is connected to the electric door locks, if any, of the automobile in the same manner as door lock connector 118 described in connection with FIG. 5. Once so connected, plug members 158 and 160 may be coupled together in order to allow communication between door lock connector 156 and security module 128. Door lock connector 156 also operates in the same manner as door lock connector 118 of FIG. 5. Accordingly, the vehicle door locks may be locked or unlocked concurrently with the arming or disarming, respectively, of security module 128.

Security module 128 also includes circuitry responsive to detecting whether the hood or trunk of the automobile has been opened. Specifically, FIG. 6 includes a hood detect sensor and a trunk detect sensor, 162 and 164, respectively. Detectors 162 and 164 are connected to the vehicle ground, and further to security module 128 via a signal conductor 166. Most contemporary automobile are equipped with detectors 162 and 164; however, if none are present, they may be installed according to principles known in the art. Each detector has an internal switch which opens or closes when the corresponding pin member is depressed or released, respectively. Thus, detectors 162 and 164 operate such that when the hood and trunk of the vehicle are closed, the switch of each is open. If, however, the hood or trunk of the vehicle is opened, its respective switch which will close, thereby grounding the conductor connected to its respective terminal. Thus, if either the hood or the trunk of the vehicle is opened, conductor 166 is grounded and this grounding is detected by security module 128. Again, similar to many of the features discussed above, this change in state indicates to security module 128 a condition change indicative of an unauthorized attempt to either vandalize or steal the vehicle. As a result, security module 128 may respond by alarming the owner by, for example, sounding siren 136.

Security module 128 also supports a manual override switch 168. Specifically, override switch 168 is connected to security module 128 via a signal conductor 170, and is connected to ground via ground conductor 172. In operation, override switch 168 permits the antitheft system to be temporarily overridden. This feature is helpful in the instance when the vehicle is temporary being serviced or entrusted to someone other than the owner, such as a valet. More specifically, once the override feature is enabled, security module 128 cannot be armed until the override feature is disabled. In particular, override switch 168 operates in conjunction with the signal on conductor 74a. Recall, the signal on conductor 74a goes active when the ignition switch is turned to RUN. Accordingly, in order to activate the override feature, a user of the vehicle must turn the ignition switch to the RUN position, and thereafter switch manual override switch 168 to its override position. Once in this state, the alarm system cannot be armed. It should be noted, however, that the requirement of turning the ignition to the RUN position prohibits an unauthorized user of the vehicle from simply moving the switch to its override position, thereby bypassing the antitheft system. It also should be noted that once security module 128 is properly armed, the manual switching of switch 168 has no affect on the arming or disarming of the system. Accordingly, only an authorized user of the vehicle having access to an ignition key may enable the override feature.

From the above, it therefore should be appreciated that security module 128 provides secondary features beyond those provided by security module 108 of FIG. 5. It should also be noted that the AudioVox Corporation Part No. APS1 supports various other components and features which may be added to the system illustrated in FIG. 6. Again, therefore, the present invention provides for a great deal of flexibility in providing either a bypass mechanism for automobile antitheft functionality, or for allowing a user to select the quantity of antitheft features he or she desires.

As an example, the AudioVox Corporation Part No. APS1 supports a motion detector which is available from AudioVox Corporation as Part No. OMD30 and compatible with security module 128. The OMD30 detects jacking or towing of the vehicle, and indicates its detection to security module 128. Again, upon the detection of the intrusion, security module 128 can respond by alerting the owner through sounding siren 136. As another example, security module 128 supports a shock sensor which is available from AudioVox Corporation as Part No. OSD60, and also is compatible with security module 128. The OSD60 detects vibration caused by attempts to break the vehicle glass or impact to the vehicle. This detection also is reported to security module 128 for evoking the proper response.

Clearly, other examples of features could be added to the illustrated security modules. Further, different security modules could also be selected, and are clearly contemplated, for use with the present invention. Thus, while the present invention has been described in detail, it should be understood that various substitutions, modifications and/or alterations could be made by one skilled in the art without departing from the scope of the intended invention. As an example, various additional secondary antitheft features could be added or substituted. As another example, the specific electrically-controlled feature of the ignition which is interrupted by the primary antitheft function need not necessarily involve the engine ignition switch, but could include other necessary operational features as well. For example, ignition timing or fuel ignition could be interrupted once the system is armed. In any instance, the benefits and flexibility of the present invention would still be maintained, and are still intended as included within the scope of the invention as defined by the following claims.

What is claimed is:

1. An antitheft system for use with a vehicle having a battery for providing a constant voltage source and a ground reference and having an electrically-controlled operational feature, wherein activation of said feature is necessary for operating said vehicle, said system comprising:
    a harness connector comprising a plurality of contacts, wherein said plurality of contacts of said harness connector comprises:
        a first contact for connecting to circuitry in said vehicle, wherein said circuitry is for providing an activating signal to activate said operational feature;
        a second contact for connecting to a terminal of said electrically controlled operational feature, said terminal for receiving said activating signal to activate said operational feature;
        a third contact for connecting to said constant voltage source; and
        a fourth contact for connecting to said ground reference; and
    a module connector for connecting to said harness connector and having contacts corresponding to said plurality of contacts of said harness connector, said module connector connected to a security module, wherein said security module comprises circuitry for selectively connecting said first contact to said second contact during a disarmed state, and for selectively disconnecting said first contact from said second contact during an armed state.

2. The antitheft system of claim 1 wherein said vehicle further has an ignition switch which provides a positive voltage when said ignition switch is turned to a run position, and wherein said harness connector further comprises a fifth contact for connecting to said ignition switch for receiving said positive voltage.

3. An antitheft system for use with a vehicle having an electrically-controlled operational feature, wherein activation of said feature is necessary for operating said vehicle, said system comprising:
    a first connector comprising a plurality of contacts, wherein said plurality of contacts comprise:
        a first contact for connecting to circuitry in said vehicle, said circuitry for providing an activating signal to activate said operational feature;
        a second contact for connecting to a terminal in said vehicle coupled to said electrically controlled operational feature, said terminal for receiving said activating signal to activate said operational feature;
    a plurality of user-selectable and interchangeable security modules, wherein each of said modules comprises:
        a second connector which is removably connectable to said first connector;
        circuitry for connecting said first contact to said second contact in a disarmed state and for disconnecting said first contact from said second contact in an armed state, such that said activating signal may be conducted from said first contact to said second contact in said disarmed state, thereby activating said operational feature;
        circuitry for performing a set of secondary antitheft functions; and
        wherein said circuitry for performing a set of secondary antitheft functions differs in each of said plurality of security modules.

4. The antitheft system of claim 3 wherein said circuitry for connecting/disconnecting said first contact to/from said second contact comprises a relay.

5. The antitheft system of claim 3 wherein said electrically-controlled operational feature comprises a starter element for engaging a motor of the vehicle and wherein said activating signal comprises an enabling signal connected to a solenoid for providing power to said starter element.

6. The antitheft system of claim 3 wherein said electrically-controlled operational feature comprises a fuel-injector for providing fuel to a motor of the vehicle and wherein said activating signal comprises an enabling signal connected to said fuel injector for opening the fuel injector.

7. The antitheft system of claim 3 wherein said vehicle further comprises a battery for providing a constant voltage source and a ground reference, and wherein said plurality of contacts of said first connector further comprise:
   a third contact connected to said constant voltage source; and
   a fourth contact connected to said ground reference.

8. The antitheft system of claim 7 wherein said vehicle further comprises an ignition switch which provides a positive voltage when said ignition switch is turned to a run position, and wherein said plurality of contacts of said first connector further comprise a fifth contact for connecting to said ignition switch for receiving said positive voltage.

9. The antitheft system of claim 3 wherein said vehicle further comprises an ignition switch which provides a positive voltage when said ignition switch is turned to an on position, and wherein said plurality of contacts of said first connector further comprise a third contact for connecting to said ignition switch for receiving said positive voltage.

10. The antitheft system of claim 3 wherein said circuitry for performing a set of secondary antitheft functions in a first of said plurality of modules comprises:
    a manual switch connected between said first and second contacts such that depression of said manual switch connects said first contact to said second contact, and such that said activating signal may be communicated from said first contact to said second contact;
    a sound element for producing audible signals, wherein a first audible signal is produced to indicate said disarmed state, and wherein a second audible signal is produced to indicate said armed state;
    a visual element for producing visual signals, wherein a first visual signal is produced to indicate said disarmed state, and wherein a second visual signal is produced to indicate said armed state; and
    circuitry for producing a lock signal for locking a door lock of said vehicle in said armed state and for producing an unlock signal for unlocking said door lock in said disarmed state.

11. The antitheft system of claim 10 wherein said vehicle comprises a plurality of doors, a trunk, and a hood, and wherein said circuitry for performing a set of secondary antitheft functions in a second of said plurality of modules comprises:
    said visual element and said circuitry for producing a lock/unlock signal of said first module, wherein said sound element comprises a first sound element;
    circuitry for detecting if any of said plurality of doors is opened;
    circuitry for detecting if said trunk is opened;
    circuitry for detecting if said hood is opened;
    a second sound element for producing an audible signal during said armed state and in response to any of said detection circuitry detecting an opened door, trunk or hood; and
    a manual switch for overriding said circuitry for disconnecting said first contact from said second contact in said armed state.

12. The antitheft system of claim 11 wherein said circuitry for performing a set of secondary antitheft functions in a third of said plurality of modules comprises:
    said sound element, said visual element and said circuitry for producing a lock/unlock signal of said first module;
    said door, trunk and hood detection circuitry, and said sound element of said second module; and
    circuitry for detecting motion of said vehicle.

13. The antitheft system of claim 11 wherein said circuitry for performing a set of secondary antitheft functions in a third of said plurality of modules comprises:
    said sound element, said visual element and said circuitry for producing a lock/unlock signal of said first module;
    said door, trunk and hood detection circuitry and said sound element of said second module; and
    circuitry for detecting an impact with said vehicle.

14. The system of claim 1 and further comprising a bypass connector for connecting to said harness connector, said bypass connector comprising at least a first and second contact corresponding to said first and second contact of said harness connector, wherein said first contact of said bypass connector is connected to said second contact of said bypass connector such that said first contact of said harness connector is electrically connected to said second contact of said harness connector when said bypass connector is connected to said harness connector.

15. The system of claim 3 and further comprising a bypass connector for connecting to said first connector, said bypass connector comprising at least a first and second contact corresponding to said first and second contact of said first connector, wherein said first contact of said bypass connector is connected to said second contact of said bypass connector such that said first contact of said first connector is electrically connected to said second contact of said first connector when said bypass connector is connected to said first connector.

16. An antitheft system for use with a vehicle having an electrically-controlled operational feature, wherein activation of said feature is necessary for operating said vehicle, said system comprising:
    a first connector comprising a plurality of contacts, and for selectively coupling to a second connector and a bypass connector, wherein said plurality of contacts of said first connector comprise:
        a first contact for connecting to circuitry in said vehicle, said circuitry for providing an activating signal to activate said operational feature;
        a second contact for connecting to a terminal in said vehicle coupled to said electrically controlled operational feature, said terminal for receiving said activating signal to activate said operational feature;

wherein said second connector is connected to one of a plurality of user-selectable and interchangeable security modules, wherein each of said modules comprises:

circuitry for connecting said first contact to said second contact in a disarmed state and for disconnecting said first contact from said second contact in an armed state, such that said activating signal may be conducted from said first contact to said second contact in said disarmed state, thereby activating said operational feature; and wherein said bypass connector comprises at least a first and second contact corresponding to said first and second contact of said first connector, wherein said first contact of said bypass connector is connected to said second contact of said bypass connector such that said first contact of said first connector is electrically connected to said second contact of said first connector when said bypass connector is connected to said first connector.

* * * * *

UNITED STATES PATENT AND TRADEMARK OFFICE
CERTIFICATE OF CORRECTION

PATENT NO. :     5,323,140
DATED      :     June 21, 1994
INVENTOR(S) :    William E. Boyles It is certified that error appears in the above-indentified patent and that said Letters Patent is hereby corrected as shown below:

Column 3, line 7, delete "invention,-and"; insert --invention, and--

Column 7, line 33, insert commas after "ON", "RUN", and "CRANK"

Signed and Sealed this

Eighteenth Day of October, 1994

Attest:

BRUCE LEHMAN

*Attesting Officer*         *Commissioner of Patents and Trademarks*